(12) United States Patent
Nagaoka et al.

(10) Patent No.: US 9,222,394 B2
(45) Date of Patent: Dec. 29, 2015

(54) DIESEL ENGINE EXHAUST GAS PURIFICATION METHOD AND EXHAUST GAS PURIFICATION SYSTEM

(71) Applicant: ISUZU MOTORS LIMITED, Tokyo (JP)

(72) Inventors: Daiji Nagaoka, Kamakura (JP); Teruo Nakada, Yokohama (JP); Hiroyuki Yuza, Yokohama (JP)

(73) Assignee: ISUZU MOTORS LIMITED, Tokyo (JP)

(*) Notice: Subject to any disclaimer, the term of this patent is extended or adjusted under 35 U.S.C. 154(b) by 0 days.

(21) Appl. No.: 14/363,934

(22) PCT Filed: Nov. 13, 2012

(86) PCT No.: PCT/JP2012/079342
§ 371 (c)(1),
(2) Date: Jun. 9, 2014

(87) PCT Pub. No.: WO2013/088887
PCT Pub. Date: Jun. 20, 2013

(65) Prior Publication Data
US 2014/0325962 A1    Nov. 6, 2014

(30) Foreign Application Priority Data

Dec. 12, 2011   (JP) .................................. 2011-271292

(51) Int. Cl.
*F01N 3/00*       (2006.01)
*F01N 9/00*       (2006.01)
(Continued)

(52) U.S. Cl.
CPC .............. *F01N 9/00* (2013.01); *B01D 53/9495* (2013.01); *F01N 3/0842* (2013.01); *F01N 3/20* (2013.01);
(Continued)

(58) Field of Classification Search
USPC ........... 60/274, 278, 286, 292, 293, 297, 301, 60/303, 324
See application file for complete search history.

(56) References Cited

U.S. PATENT DOCUMENTS 6,834,496 B2 * 12/2004 Nakatani et al. ................. 60/274
7,246,485 B2 *  7/2007 Ohki et al. ....................... 60/285
(Continued)

FOREIGN PATENT DOCUMENTS

JP   2000-356127    12/2000
JP   2003-120368     4/2003
(Continued)

OTHER PUBLICATIONS

Patent Abstracts of Japan, Publication No. 2000-356127, Published Dec. 26, 2000, 2 pages.
(Continued)

*Primary Examiner* — Binh Q Tran
(74) *Attorney, Agent, or Firm* — Staas & Halsey LLP

(57) ABSTRACT

An exhaust gas purification method of a diesel engine, which purifies exhaust gas while suppressing deterioration in drivability and fuel consumption, including when exhaust gas enters a rich reduction state, opening an EGR valve and closing an intake throttle, if a temperature of an NOx occlusion reduction catalyst is at or above a predetermined temperature, and a vehicle having a diesel engine is decelerating from a speed at or above a predetermined speed, and then closing an exhaust throttle provided downstream of the NOx occlusion reduction catalyst and supplying fuel to the NOx occlusion reduction catalyst as a reductant.

9 Claims, 3 Drawing Sheets

(51) Int. Cl.
  *F02D 21/08* (2006.01)
  *F01N 3/08* (2006.01)
  *F02D 41/02* (2006.01)
  *F01N 3/20* (2006.01)
  *F02D 9/04* (2006.01)
  *F02D 41/00* (2006.01)
  *B01D 53/94* (2006.01)
  *F02D 41/18* (2006.01)

(52) U.S. Cl.
  CPC ............ *F02D 21/08* (2013.01); *F02D 41/0005* (2013.01); *F02D 41/0052* (2013.01); *F02D 41/0055* (2013.01); *F02D 41/0275* (2013.01); *B01D 53/9409* (2013.01); *B01D 2251/208* (2013.01); *B01D 2255/91* (2013.01); *B01D 2258/012* (2013.01); *F01N 2240/36* (2013.01); *F01N 2560/026* (2013.01); *F02D 9/04* (2013.01); *F02D 41/18* (2013.01); *F02D 2041/0017* (2013.01); *F02D 2200/0802* (2013.01); *F02D 2200/501* (2013.01); *Y02T 10/42* (2013.01); *Y02T 10/47* (2013.01)

(56) References Cited

U.S. PATENT DOCUMENTS 8,234,866 B2 *  8/2012  Nagae ......................... 60/605.2
8,347,613 B2 *  1/2013  Van Nieuwstadt .............. 60/297
8,555,615 B2 * 10/2013  Murata et al. .................. 60/284

FOREIGN PATENT DOCUMENTS

JP   2007-16713    1/2007
JP   2009-275561   11/2009

OTHER PUBLICATIONS

Patent Abstracts of Japan, Publication No. 2003-120368, Published Apr. 23, 2003, 2 pages.
Patent Abstracts of Japan, Publication No. 2007-016713, Published Jan. 25, 2007, 2 pages.
Patent Abstracts of Japan, Publication No. 2009-275561, Published Nov. 26, 2009, 1 page.
International Search Report mailed Jan. 15, 2013 in corresponding International Patent Application No. PCT/JP2012/079342, 2 pages.

* cited by examiner

DIESEL ENGINE EXHAUST GAS PURIFICATION METHOD AND EXHAUST GAS PURIFICATION SYSTEM

CROSS-REFERENCE TO RELATED APPLICATIONS

This application claims the benefit under 35 U.S.C. Section 371, of PCT International Application No. PCT/JP2012/079342, filed Nov. 13, 2012, and under 35 U.S.C. §119 of Japanese Application No. 2011-271292, filed Dec. 12, 2011, the contents of which are incorporated herein by reference.

BACKGROUND OF THE INVENTION

1. Technical Field

The present invention relates to an exhaust gas purification method and an exhaust gas purification system, and more particularly to a diesel engine exhaust gas purification method and an exhaust gas purification system which can purify exhaust gas while suppressing deteriorations in drivability and fuel consumption.

2. Background Art

In a diesel engine exhaust gas purification system, an NOx occlusion reduction catalyst is used in order to reduce nitrogen oxides (NOx) contained in exhaust gas, unlike a gasoline engine (see Japanese patent application Kokai publication No. 2009-275561, for example). This is because since the exhaust gas of the diesel engine is a lean atmosphere in terms of the air-fuel ratio, it is impossible to directly employ a three-way catalyst used in a stoichiometric atmosphere as in the case of the gasoline engine.

This diesel engine exhaust gas purification system performs a regeneration operation in which an NOx occlusion material (an alkali metal or alkali earth metal such as K and Ba) is allowed to temporarily occlude NOx within the exhaust gas when it is in the lean state, and the state thereof is periodically changed into rich so as to release the occluded NOx to reduce it by virtue of the three-way function.

In order to change the state of the exhaust gas of the diesel engine into rich, it is necessary to throttle the amount of air-intake, and/or supply fuel into the exhaust gas by post-injection or exhaust injection. However, the former reduction of the amount of air-intake might lead to deterioration in drivability of a vehicle, and the latter fuel supply might lead to deterioration in fuel consumption.

PRIOR ART DOCUMENT

Patent Document 1: Japanese patent application Kokai publication No. 2009-275561

SUMMARY OF THE INVENTION

An object of the present invention is to provide a diesel engine exhaust gas purification method and an exhaust gas purification system which can purify exhaust gas while suppressing deteriorations in drivability and fuel consumption.

The diesel engine exhaust gas purification method to achieve the above-described object is an exhaust gas purification method for purifying exhaust gas of a diesel engine mounted on a vehicle using an NOx occlusion reduction catalyst, and includes the steps of: when the exhaust gas enters a rich reduction waiting state, opening an EGR valve and closing an intake throttle if a temperature of the NOx occlusion reduction catalyst is at or above a predetermined temperature and the vehicle is decelerating from a speed at or above a predetermined speed; and then closing an exhaust throttle provided downstream of the NOx occlusion reduction catalyst, and supplying a reductant to the NOx occlusion reduction catalyst.

In the above-described diesel engine exhaust gas purification method, the exhaust throttle is closed when a predetermined time has elapsed after opening of the EGR valve and closing of the intake throttle. Alternatively, the exhaust throttle is closed when a mass air flow value of intake air of the diesel engine becomes equal to or smaller than a reference value after opening of the EGR valve and closing of the intake throttle.

Further, it is preferred that the predetermined temperature is 200° C. and the predetermined speed is 20 km/h.

The exhaust gas purification system of the diesel engine to achieve the above-described object is an exhaust gas purification system including an intake throttle assembled to an intake passage of a diesel engine mounted on a vehicle, an NOx occlusion reduction catalyst installed in an exhaust passage, an EGR valve assembled to an EGR passage communicating from the intake passage to the exhaust passage, and a reductant supply unit configured to supply a reductant to the NOx occlusion reduction catalyst, and includes: an exhaust throttle provided to the exhaust passage on a downstream side of the NOx occlusion reduction catalyst, and a control unit configured to control the intake throttle, EGR valve and exhaust throttle, wherein the control unit, when exhaust gas flowing through the exhaust passage enters a rich reduction waiting state, opens the EGR valve and closes the intake throttle if a temperature of the NOx occlusion reduction catalyst is at or above a predetermined temperature, and the vehicle is decelerating from a speed at or above a predetermined speed, and then closes the exhaust throttle and activates the reductant supply unit.

According to the diesel engine exhaust gas purification method and the exhaust gas purification system of the present invention, the state of the exhaust gas is changed into rich when the vehicle is decelerating from a speed at or above the predetermined speed, thus suppressing deterioration in drivability. Further, since the amount of the exhaust gas is throttled when the state of the exhaust gas is changed into rich, less fuel is needed to be supplied to change the state of the exhaust gas into rich, thus suppressing deterioration in fuel consumption.

DETAILED DESCRIPTION

Hereinafter, a description will be given of an embodiment of the present invention with reference to the drawings.

Figure 1:
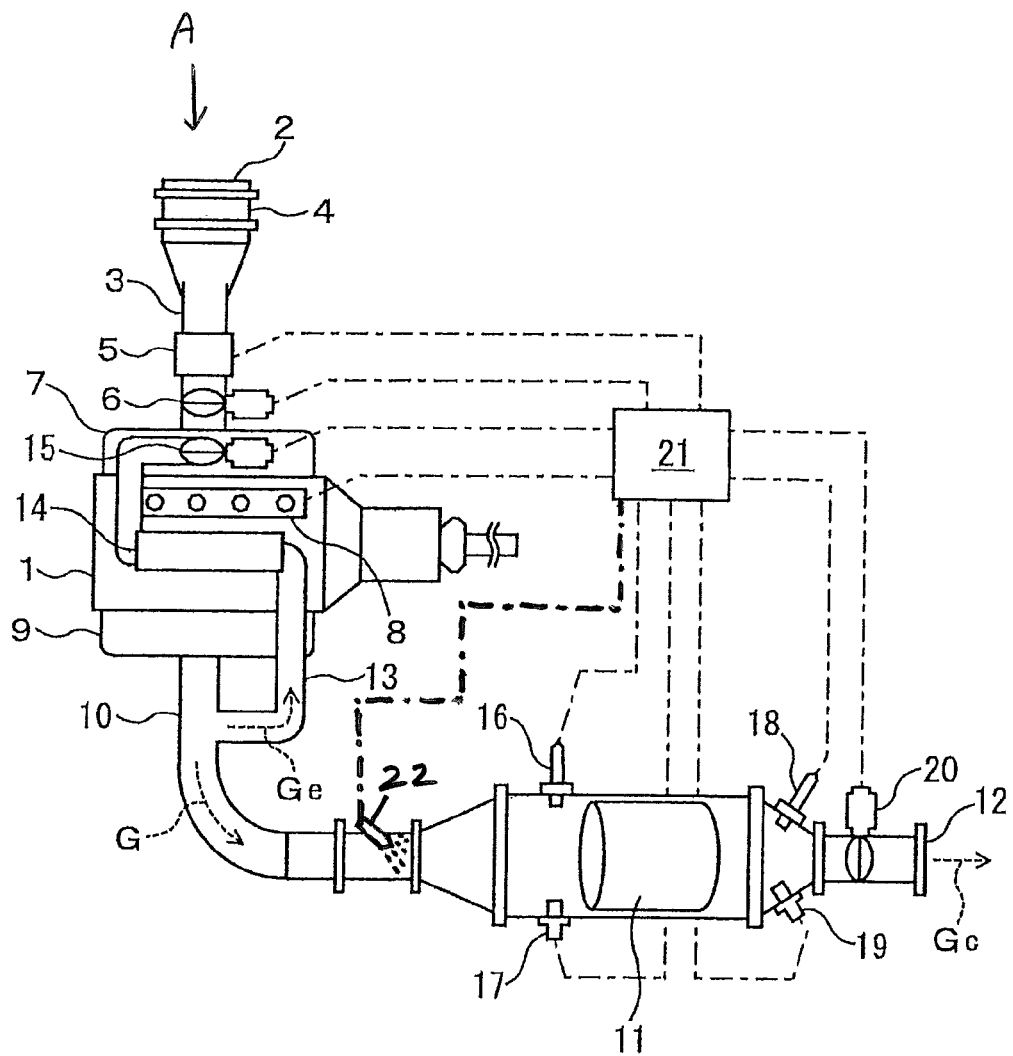
FIG. 1 is a schematic view of a diesel engine exhaust gas purification system according to an embodiment of the present invention.

FIG. 1 shows a diesel engine exhaust gas purification system according to an embodiment of the present invention. In a diesel engine 1 equipped with this diesel engine exhaust gas purification system, air A taken from an inlet port 2 into an intake passage 3 sequentially passes through an air cleaner 4 and a mass air flow sensor (MAF sensor) 5, and after the amount of air-intake is regulated with an intake throttle 6, is supplied into each cylinder from an intake manifold 7. Then, after fuel injected through a common rail injection system 8 is burned, the air is discharged from an exhaust manifold 9 into an exhaust passage 10 as exhaust gas G. Then, it passes through an NOx occlusion reduction catalyst 11 and is discharged from an exhaust port 12 as purified exhaust gas Gc. Further, part of exhaust gas G is diverted into an EGR passage 13 as EGR gas Ge, and after being cooled down by an EGR cooler 14, is recirculated to the intake manifold 7 via an EGR valve 15.

The NOx occlusion reduction catalyst 11 is constructed by a catalyst metal and an NOx occlusion material being supported on a surface of a monolithic honeycomb-cell support formed of γ-alumina, etc. Pt or Pd is used as a catalyst metal. Further, any one of alkali metals such as K, Na, Li, Cs and alkali earth metals such as Ba, Ca, or a plurality of them in combination is/are used as an NOx occlusion material.

In this NOx occlusion reduction catalyst 11, when the exhaust gas G is in the lean state, NO within the exhaust gas G is oxidized into NO2 by the oxidation catalyst, diffused into the catalyst in the form of NO3 and absorbed by the NOx occlusion material in the form of a nitrate. Then, when the state of the exhaust gas G is changed into rich, NO3− is released from the NOx occlusion material in the form of NO2. This released NO2 is reduced to N2 by the action of the oxidation catalyst with the aid of a reductant such as unburned HC contained in the exhaust gas G.

In order to change the state the exhaust gas G into rich, a reductant such as diesel oil fuel is supplied into the exhaust gas G by a reductant supply unit 22. Examples of this reductant supply unit include post-injection in fuel injection into the cylinder, a fuel injection nozzle provided in the exhaust passage 10, etc. Note that using the latter fuel injection nozzle has the advantage that the problem of fuel dilution of engine oil, which arises in the case of the post-injection, can be avoided. Regulating the amount of fuel supply is performed by regulating the injection amount and injection timing in these reductant supply units.

A catalyst inlet exhaust concentration sensor 16 and a catalyst inlet temperature sensor 17 are installed on the inlet of the NOx occlusion reduction catalyst 11 (near the upstream side), and a catalyst outlet exhaust concentration sensor 18 and a catalyst outlet temperature sensor 19 are installed on the outlet (near the downstream side). These exhaust concentration sensors 16 and 18 measure the excess air ratio λ and the NOx concentration of the exhaust gases G and Gc.

The diesel engine exhaust gas purification system of the present invention is configured such that an exhaust throttle 20 is provided to the exhaust passage 10 on the downstream side of the NOx occlusion reduction catalyst 11, with an ECU (Engine Control Unit) 21 serving as a control unit controlling this exhaust throttle 20, the intake throttle 6 and the EGR valve 15. Note that the ECU 21 also controls the MAF sensor 5, the common rail injection system 8, the exhaust concentration sensors 16 and 18, and the catalyst temperature sensors 17 and 19, and gathers measurement data thereof. Note that dashed lines shown in FIG. 1 represent signal transmission paths.

Hereinafter, a description will be given of an exhaust gas purification method using the diesel engine exhaust gas purification system having the above configuration, based on a flow diagram shown in FIG. 2.

Initially, the ECU 21 determines whether the NOx occlusion reduction catalyst 11 is in a rich reduction waiting state (S10). The rich reduction waiting state corresponds to a state in which the absorptive capacity of the NOx occlusion material is nearly saturated. Exemplary methods for the determination include a method which compares an NOx occlusion amount (increase from the previous reduction treatment) or an NOx purification rate calculated from measured values of the exhaust concentration sensors 16 and 18, with a predefined threshold, etc.

When it is determined that the rich reduction waiting state has been reached, it is checked whether the temperature of the NOx occlusion reduction catalyst 11 is at or above a predetermined temperature, and a vehicle mounting the diesel engine 1 is decelerating from a speed at or above a predetermined speed (S20). The temperature of the NOx occlusion reduction catalyst 11 can be determined, for example, by calculating it from measured values of the catalyst temperature sensors 17 and 19, by measuring it with a thermocouple (not shown) installed near the catalyst, and so on. Further, the predetermined temperature is preferably 200° C. If the temperature of the NOx occlusion reduction catalyst 11 is below 200° C., reduction action by the reductant significantly comes down.

The vehicle's speed can be calculated from an engine rotation speed, etc. Further, the predetermined speed is preferably 20 km/h. If the vehicle's speed is below 20 km/h, there is only a short time from deceleration to stopping, giving insufficient time for reduction reaction after closure of the exhaust throttle 20 described below. Further, whether the vehicle is in a decelerating state is determined from the amount of fuel injection of the common rail injection system 8 (e.g., injection amount=0), the accelerator opening (e.g., opening=0°), etc.

Then, if the temperature of the NOx occlusion reduction catalyst 11 is at or above the predetermined temperature, and the vehicle is decelerating from a speed at or above the predetermined speed, the EGR valve 15 is opened and the intake throttle 6 is closed (S30).

Next, when a predefined condition for closure of the exhaust throttle 20 is satisfied (S40), the exhaust throttle 20 is closed (S50), and the reductant supply unit is activated to supply the fuel into the exhaust gas G so as to change the state thereof into rich (S60). This reductant injection amount is set such that the excess air ratio λ calculated from the exhaust concentration sensors 16 and 18 equals to a target value calculated from the air-intake amount. More precisely, the target value of the excess air ratio λ is set by predefining a target value on a trial basis, and referring to a three-dimensional map of "a target value with respect to an engine rotation speed and a fuel flow rate" created from the target value, at the time of control. Then, the amount of injection is determined from the difference between the amount of in-cylinder injection by the common rail injection system 8 (an indicated value, or a calculated value from the measured values of the exhaust concentration sensors 16 and 18 and the measured value of the MAF sensor 5), and a required fuel flow rate calculated from the target value of the excess air ratio λ and the measured value of the MAF sensor 5.

Finally, after a certain period of time has elapsed from the fuel supply, or after the deceleration of the vehicle has ended, the reductant supply unit is stopped and the exhaust throttle 20 is opened.

As described above, the state of the exhaust gas G is changed into rich when the vehicle is decelerating from a speed at or above the predetermined speed, thus suppressing deterioration in drivability. Further, because when the state of the exhaust gas G is changed into rich, the EGR valve 15 is opened, and the intake throttle 6 and the exhaust throttle 20 are closed to throttle the exhaust gas amount, less fuel is needed to be supplied from the reductant supply unit, thus suppressing deterioration in fuel consumption.

Moreover, since the temperature of the exhaust gas G is increased and the flow rate thereof is decreased, the time period required for reduction is extended, thus improving the reduction efficiency. In order to ensure that this time period required for reduction is sufficient, the vehicle should be in the course of deceleration from a speed at or above the predetermined speed, as described above. Further, from a mechanical viewpoint, since only the exhaust throttle has to be provided to a conventional engine configuration, the exhaust gas purification system can be realized at low cost.

The predefined condition (S40) for closure of the exhaust throttle 20 may be defined such that it is closed after the elapse of the predetermined time period (such as 0.1 to 3 seconds, for example) determined in advance, as well as at the time point when the measured value of the MAF sensor 5 exceeds a reference value. This reference value for the MAF sensor 5 is set such that the peak value of the exhaust pressure when the exhaust throttle 20 is closed falls within a range in which the NOx occlusion reduction catalyst 11 itself, the sensors 16 to 19 in the vicinity thereof and so on will not be damaged. The reference value may be about 30 to 80 kPa for a common heavy vehicle, although it cannot be uniformly set because it varies depending on the size, specification, etc. of the diesel engine 1.

Note that, if a time lag is provided from the opening of the EGR valve 15 and the closing of the intake throttle 6, until the closing of the exhaust throttle 20, rapid increase of the exhaust pressure is suppressed, allowing the exhaust throttle 20 to be operable even under a high engine rotation speed, which facilitates implementation of the diesel engine exhaust gas purification method.

Figure 2:
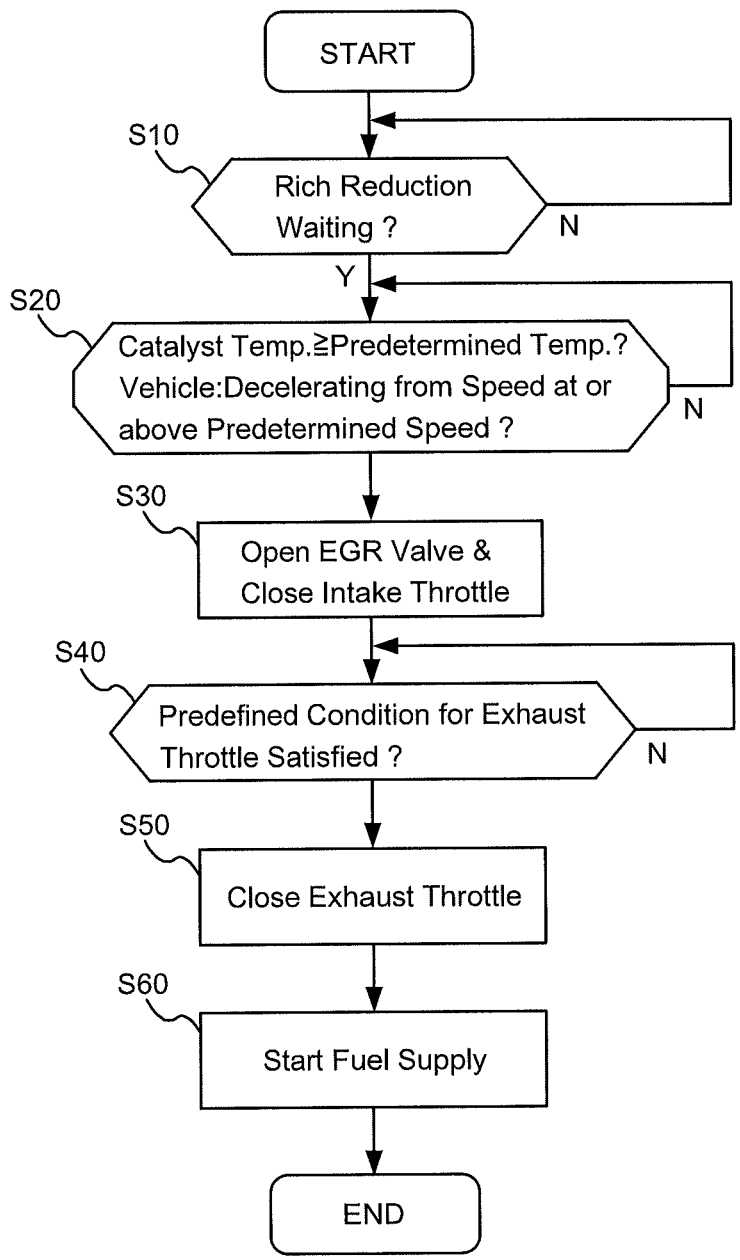
FIG. 2 is a flow diagram illustrating a diesel engine exhaust gas purification method according to an embodiment of the present invention.

Although, in FIG. 2, the rich reduction waiting state is initially determined, the step S10 regarding such determination may be omitted. In this case, the processes of the steps S20 to S60 are performed regardless of the rich reduction waiting state whenever the temperature of the NOx occlusion reduction catalyst 11 is at or above the predetermined temperature and the vehicle is decelerating from a speed at or above the predetermined speed, thereby preventing the temperature drop of the NOx occlusion reduction catalyst 11, which further improves the reduction efficiency.

During actual driving, acceleration may sometimes be started immediately on deceleration of the vehicle. In such a case, since a sufficient time period required for reduction cannot be ensured, it is preferred to open the exhaust throttle 20 giving priority on acceleration performance.

Practical Example

Figure 3:
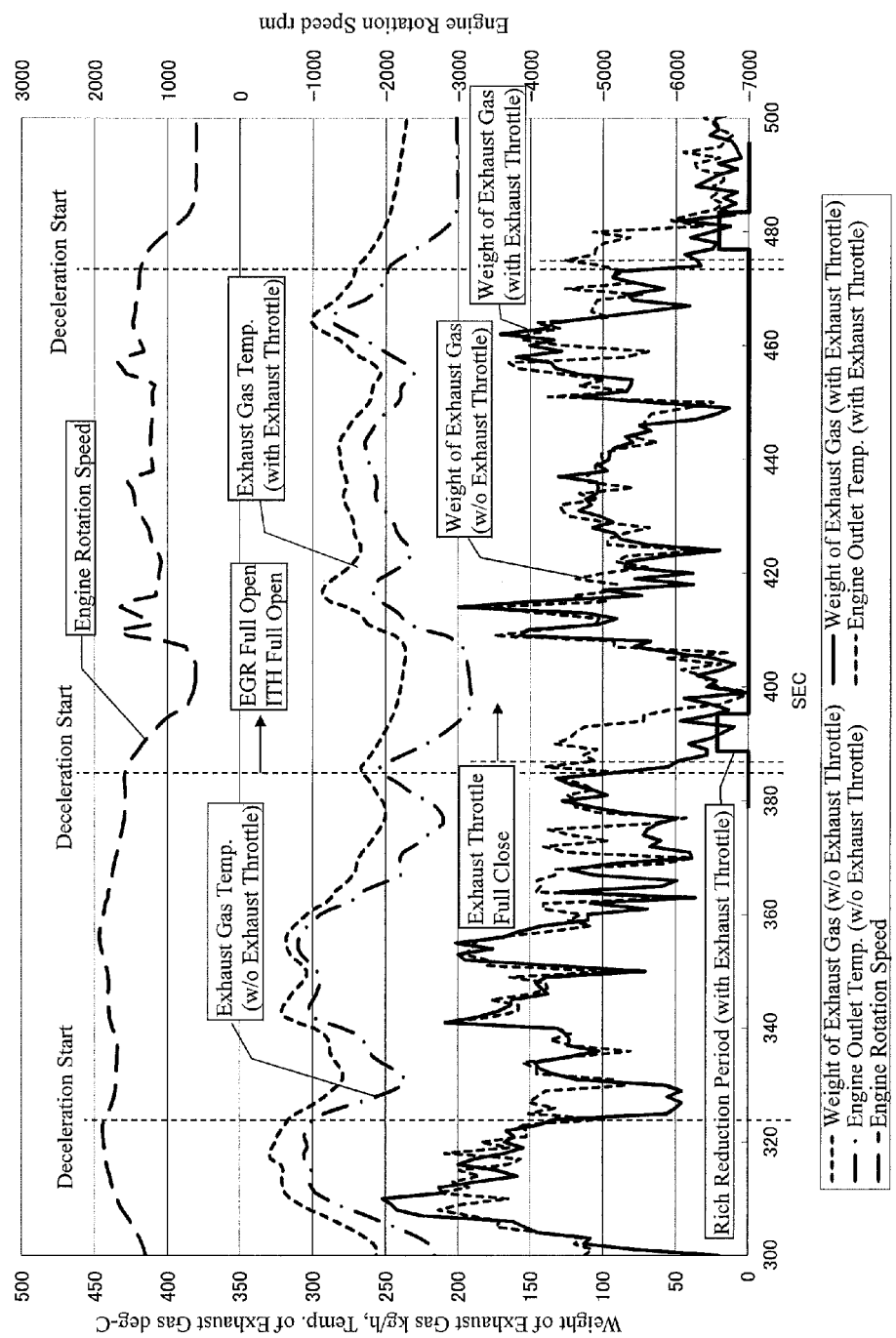
FIG. 3 is a graph showing an example of the diesel engine exhaust gas purification method of the present invention.

In FIG. 3, the result of purifications of the exhaust gas of the diesel engine 1 is shown, which were respectively performed using the diesel engine exhaust gas purification system (practical example) configured as shown in FIG. 1, and an exhaust gas purification system (comparative example) in which the exhaust throttle 20 has been removed from the configuration of FIG. 1. Note that it is assumed that the NOx occlusion reduction catalyst 11 is at or above the predetermined temperature. Temporal changes of these exhaust gas purification systems are described as follows.

(1) When it is determined that the catalyst is in the rich reduction waiting state, the EGR valve 15 is fully opened and the intake throttle ("ITH") 6 is fully closed if the vehicle is decelerating from a speed of 50 km/h (corresponding to the engine rotation speed=about 1500 rpm). (2) As a result, the amount of the exhaust gas G decreases. (3) Then, in the practical example, when the amount or weight of the exhaust gas G satisfies the predetermined condition for closure of the exhaust throttle 20, "the exhaust pressure during operation is at or below the threshold", the exhaust throttle 20 is fully closed. (4) The fuel is supplied by the reductant supply unit so as to reduce NOx.

It can be seen from the result of FIG. 3 that in the practical example, compared to the comparative example, the amount of the exhaust gas G during deceleration decreases below that of the comparative example, and the temperature drop of the exhaust gas G.

The invention claimed is:

1. An exhaust gas recirculation exhaust gas purification method for purifying exhaust gas of a diesel engine mounted on a vehicle using an NOx occlusion reduction catalyst, comprising:
   when the NOx occlusion reduction catalyst has reached a rich reduction waiting state,
      opening an exhaust gas recirculation valve and closing an intake throttle, if a temperature of the NOx occlusion reduction catalyst is at or above a predetermined temperature and the vehicle is decelerating from a speed at or above a predetermined speed; and then
      closing an exhaust throttle provided downstream of the NOx occlusion reduction catalyst, and supplying a reductant to the NOx occlusion reduction catalyst.

2. The exhaust gas purification method according to claim 1, wherein the exhaust throttle is closed when a predetermined time has elapsed after the opening of the exhaust gas recirculation valve and the closing of the intake throttle.

3. The exhaust gas purification method according to claim 1, wherein the exhaust throttle is closed when a mass air flow value of intake air of the diesel engine becomes equal to or smaller than a reference value after the opening of the exhaust gas recirculation valve and the closing of the intake throttle.

4. The exhaust gas purification method according to claim 1, wherein the predetermined temperature is 200° C. and the predetermined speed is 20 km/h.

5. An exhaust gas purification system including an intake throttle at an intake passage of a diesel engine mounted on a vehicle, an NOx occlusion reduction catalyst at an exhaust passage, an exhaust gas recirculation valve at an exhaust gas recirculation passage communicating from the intake passage to the exhaust passage, and a reductant supply unit configured to supply a reductant to the NOx occlusion reduction catalyst, the exhaust gas purification system comprising:
   an exhaust throttle at the exhaust passage on a downstream side of the NOx occlusion reduction catalyst; and
   a control unit configured to control the intake throttle, the exhaust gas recirculation valve and the exhaust throttle,
   a first sensor to detect when the NOx occlusion reduction catalyst has reached a rich reduction waiting state,
   a second sensor to detect a temperature of the NOx occlusion reduction catalyst, and
   a third sensor to detect a speed of the vehicle,
   wherein the control unit, when the first sensor detects that the NOx occlusion reduction catalyst has reached the rich reduction waiting state,
      opens the exhaust gas recirculation valve and closes the intake throttle, if a temperature of the NOx occlusion reduction catalyst detected by the second sensor is at or above a predetermined temperature, and the vehicle speed detected by the third sensor is decelerating from a speed at or above a predetermined speed, and then
      closes the exhaust throttle and causes the reductant supply unit to supply the reductant.

6. The exhaust gas purification method according to claim 2, wherein the predetermined temperature is 200° C. and the predetermined speed is 20 km/h.

7. The exhaust gas purification method according to claim 3, wherein the predetermined temperature is 200° C. and the predetermined speed is 20 km/h.

8. The exhaust gas purification method according to claim 5, wherein the predetermined temperature is 200° C.

9. The exhaust gas purification method according to claim 5, wherein the predetermined speed is 20 km/h.

* * * * *